Patented Jan. 7, 1941

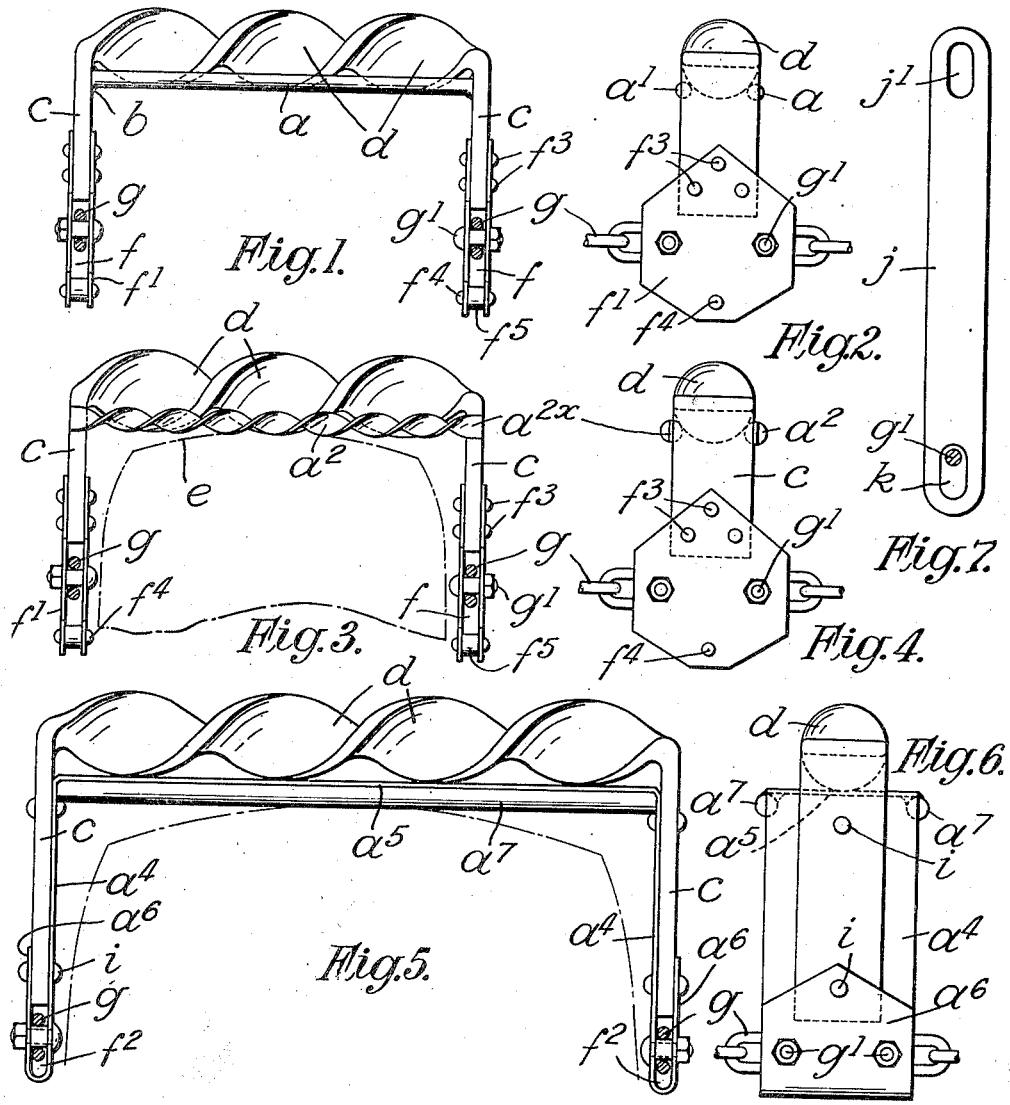

2,227,782

UNITED STATES PATENT OFFICE 2,227,782

NONSKID DEVICE

Donald Stuart Kennedy, Longparish, Andover, England

Application May 24, 1939, Serial No. 275,533
In Great Britain July 20, 1938

3 Claims. (Cl. 152—226)

This invention has reference to overall chains or girdles for use upon the tires of road vehicle wheels. It refers more particularly to that kind of nonskid chain or girdle which comprises a detachable endless chain consisting of a series of spaced-apart shoes each comprising one or more transverse members of twisted shape, adjacent shoes being connected by lateral retaining members.

My prior patent specification No. 2,095,523 describes such a shoe with one or more cross members made from metal bar or ribbon of twisted shape.

When using shoes of that construction in road, cross-country or agricultural work, it is sometimes found that the inner edges of the crests of the transverse twisted element will chafe or wear the rubber tread of the tire due to the relative creeping movement; this applies particularly to pneumatic tires with deep patterned treads. In another prior patent specification No. 2,163,493, I have described means to prevent or mitigate such chafing or wear and to increase the rigidity of the transverse twisted element.

The present invention forms a development of that described in my said prior patent specification No. 2,163,493 and has for its main object to provide the transverse twisted member with a pair of circumferentially spaced means interposed between the twisted member and the tire, for protecting the tread of the tire against undue chafing or wear by the twisted member. The means I employ may take the form of protective rods, bars or strips of rigid material, extending across the tire tread, the said protective strips being on the inner side of the shoe and thus interposed between the twisted element and the tire-tread, and furthermore being extended for projecting in advance of and to rear of the twisted element.

The invention is hereafter described with reference to the accompanying drawing, in which:

Figs. 1 and 2 are respectively a front elevation and an end elevation, showing one form of the protective means according to this invention.

Figs. 3 and 4 are respectively a front elevation and an end elevation of a modified form of such protective means.

Figs. 5 and 6 are respectively a front elevation and an end elevation of a second form of the protective means according to the present invention.

Fig. 7 is an elevation of a suitable connecting link member for adjacent shoes.

In the arrangement illustrated in Figs. 1 and 2, two protective cross rods $a$ $a1$ of metal are secured by means of welding (as indicated at $b$) to the inside of the extremital lugs or bar-ends $c$ $c$ of the twisted metal bar or strip $d$. The latter forms one shoe of the endless chain and extends across the tire tread $e$. The extremital bar-ends $c$ $c$ are shown in the form of radially elongated or prolonged end lugs which are directed towards the wheel-axis so as to be parallel to one another. These lugs or bar-ends $c$ $c$ are provided with devices for attachment to the lateral linkages such, for example, as retaining chains, with pockets $f$ $f$ to house the end links of the adjacent chain lengths $g$ $g$ and to be traversed by anchorage bolts $g1$. These pockets are formed between the plates $f1$ $f1$ which are shown riveted at $f3$ to the end bars $c$ $c$ and also riveted together at $f4$ with a spacer washer $f5$ between the plates $f1$ $f1$.

These two protective metal rods $a$ $a1$ are preferably parallel to one another and are so arranged that in extending across the tire one projects slightly in advance of and the other slightly to the rear of the extreme periphery or edge of the twisted bar $d$ and as will be understood from Fig. 2, so that the tire tread makes contact with the pair of rods $a$ $a1$. The outer surfaces of the two rods $a$ $a1$ extend slightly beyond the leading and trailing edges of the bar-end $c$ which edges are shown in register with the front and rear edges of the twisted bar $d$.

These rods $a$ $a1$ are considerably smaller in diameter than the twisted bar $d$ but owing to their spacing apart they very considerably protect the tire tread against chafing by the twisted bar $d$. The protective means provided by the rods $a$ $a1$ is thus interposed between the tire tread $e$ and the twisted bar $d$.

In Figs. 1 and 2 the pair of protective rods $a$ $a1$ are shown cylindrical. In the modification of Figs. 3 and 4, the protective members are subsidiary twisted metal strips or ribbons $a2$ and the twist or pitch is considerably less than that of the main twisted bar $d$. These subsidiary twisted strips $a2$ are carried by the bar $d$ and are shown welded at their flat ends $a2x$ against the ends $c$ $c$ of the main twisted bar $d$.

In another form of carrying out the invention, (Figs. 5 and 6) the twisted bar $d$ is provided with lugs or ends $c$ $c$ which are elongated, and said bar is itself secured upon the outside of protective means comprising a pair of circumferentially spaced rods $a1$ and a flat cross member $a5$ also provided with radially elongated end lugs $a4$ which bear against those $c$ $c$ of the twisted bar $d$, and two sets of end lugs $a4$ and $c$ $c$ being held together by bolts or rivets $i$. The flat cross member $a5$ is here shown provided with the stiffening rods or beadings $a7$ at the leading and trailing edges of the cross member $a5$. In this arrangement, the inner protective cross member $a5$ may be the cross-member or one of the cross-members of the shoe fitted with the twisted bar $d$.

The rods or beadings $a7$ $a7$ are located at each outer corner between the flat cross member $a5$ and the side wall $a4$, and they are welded or similarly secured parallel with the cross member $a5$, the two rods being each partly inside a corner but where they extend across the tire, one in advance of and one to rear of the twisted element $d$, as clearly shown in Fig. 6.

The twisted bar $d$ with elongated end lugs $c$ $c$ is thus secured upon a built-up protective member. This built-up member consists of the side walls $a4$ $a4$ each extending fore and aft of the end lug $c$ on that side of the shoe and connected together transversely by a flat cross-member $a5$.

The radially inner end of each side wall $a4$ is turned back and outwardly in U-fashion as at $a6$ and one elongated end lug $c$ of the twisted bar $d$ is socketed or secure in such U-portion $a4$, $a6$. The top edge of the outer wall $a6$ may be gable-shaped as shown in Fig. 6. The bar-end $c$ may be secured in the U by a transverse bolt or screw $i$. The U-portion of the side wall $a4$ $a6$ extending over the sides of the tire and towards the axis of the wheel acts also as a housing $f2$ for the end link $g$ of each of the lengths of retaining chains which extend between adjacent shoes.

As many transverse bolts or screws $i$ $i$ as desired may be employed to hold the U-shaped portion $a4$ $a6$ and the end lug $c$ together and similar bolts or screws $g1$ may serve as cross pins for the end links $g$ of the retaining chains.

The tread $e$ of the tire is in the example of Fig. 6 protected by the interposed cross rods or beadings $a7$ $a7$ and the flat cross member $a5$. In such arrangement, the side walls $a4$ $a4$ are continued fore and aft of the bar-ends $c$ $c$ of the twisted bar $d$ and are turned up in U-fashion to facilitate the attachment of the retaining linkages between adjacent shoes.

In Figs. 2 and 4, I have shown the linkages as chain links $g$ secured in housings or pockets by means of the cross-bolts $g1$. Other forms of linkage may, however, be employed to connect in series the shoes of the chain. Thus in Fig. 7, I have shown a straight link member $j$ apertured at $j1$ with oval slots. These slots $j1$ may be occupied by eccentric washers or spacing devices of the kind described in my prior patent specification No. 1,942,338. One of such eccentric washers is indicated at $k$. The cross bolt $g1$ passes through said washer $k$ and the link $j$.

The provision of the protective strips or bars will not only strengthen the main twisted bar and increase its rigidity but will prevent chafing of deeply patterned tire-treads and at the same time distribute the extent of the engagement surface between the tire-tread and the overall chain or girdle. The extension of the protective means in advance of and to rear of the main twisted bar also assists the engagement of the shoe with the tread of the tire.

What I claim is:

1. A shoe for a non-skid device of the character described, comprising a rigid metal bar twisted intermediately of its ends and adapted to be set across the tire-tread, said ends being continued over the sides of the tire and towards the axis of the wheel, and a pair of circumferentially spaced tire-protecting means secured to said bar-ends and interposed between said twisted bar and said tire-tread, said tire-protecting means projecting one in advance of and the other to rear of said bar-ends in the circumferential direction.

2. A shoe for a non-skid device of the character described and comprising a rigid metal bar twisted intermediately of its ends and adapted to be set across the tire-tread, said ends being continued over the sides of the tire and towards the axis of the wheel, means for laterally connecting said shoe with adjacent shoes, and a pair of circumferentially spaced tire-protecting cross-members rigidly attached to the ends of said twisted bar and set parallel with the axis of said twisted bar, said protective cross-members extending transversely of the tire-tread and being interposed between said twisted bar and said tire-tread and one of said tire-protecting cross-members at its outer face extending in advance of said bar-ends and another of said tire-protecting cross-members at its outer face extending to rear of said bar-ends.

3. A shoe for a non-skid device of the character described and comprising a single rigid main metal bar twisted intermediately of its ends and adapted to be set across the tire-tread, said ends being continued over the sides of the tire and towards the axis of the wheel, means for laterally connecting said shoe to adjacent shoes, and two subsidiary twisted members arranged with their axes parallel to the axis of said main twisted bar, each of said subsidiary twisted members being of a pitch less than that of said main twisted bar, opposite ends of said subsidiary twisted members being welded to the ends of said main twisted bar to secure said subsidiary members between the tire-tread and said main twisted bar, and said subsidiary twisted members being spaced apart circumferentially of the tire-tread so as to project partially one in advance of and the other to rear of the ends of said main twisted bar.

DONALD STUART KENNEDY.